US009214854B2

(12) United States Patent
Chen et al.

(10) Patent No.: US 9,214,854 B2
(45) Date of Patent: Dec. 15, 2015

(54) TOTAL HARMONIC CURRENT DISTORTION CONTROL CIRCUIT AND METHOD THEREOF

(71) Applicant: VOLTRONIC POWER TECHNOLOGY CORP., Taipei (TW)

(72) Inventors: Ming Hsien Chen, New Taipei (TW); Bin Hu, Hunan (CN); Juor-Ming Hsieh, Taipei (TW)

(73) Assignee: VOLTRONICS POWER TECHNOLOGY CORP., Taipei (TW)

( * ) Notice: Subject to any disclaimer, the term of this patent is extended or adjusted under 35 U.S.C. 154(b) by 53 days.

(21) Appl. No.: 14/183,167

(22) Filed: Feb. 18, 2014

(65) Prior Publication Data

US 2015/0236581 A1    Aug. 20, 2015

(51) Int. Cl.
*G05F 1/00* (2006.01)
*H02M 1/42* (2007.01)
*H02M 7/537* (2006.01)

(52) U.S. Cl.
CPC ............ *H02M 1/4208* (2013.01); *H02M 7/537* (2013.01)

(58) Field of Classification Search
CPC .......................... H02M 7/537; H02M 1/4208
USPC ......... 363/21.15–2.18, 44, 49, 53, 81, 89, 95, 363/97, 124; 323/207, 222, 271, 282–285
See application file for complete search history.

(56) References Cited

U.S. PATENT DOCUMENTS

| 5,764,039 | A | * | 6/1998 | Choi | ................... | H02M 1/4225 |
| | | | | | | 323/222 |
| 6,259,613 | B1 | | 7/2001 | Lee et al. | | |
| 2006/0119337 | A1 | * | 6/2006 | Takahashi | ................. | G06F 1/70 |
| | | | | | | 323/282 |
| 2010/0265741 | A1 | | 10/2010 | Usui | | |
| 2012/0249091 | A1 | * | 10/2012 | Chen | ................... | H02M 1/4225 |
| | | | | | | 323/207 |

FOREIGN PATENT DOCUMENTS

| CN | 102437727 B | 10/2013 |
| EP | 1944856 A1 | 7/2008 |
| JP | 2012-115123 A | 6/2012 |
| TW | 201327088 A1 | 7/2013 |
| TW | 201336220 A1 | 9/2013 |

* cited by examiner

*Primary Examiner* — Adolf Berhane
*Assistant Examiner* — Afework Demisse
(74) *Attorney, Agent, or Firm* — Li & Cai Intellectual Property (USA) Office (57) ABSTRACT

A total harmonic current distortion (THDi) control circuit includes a power factor correction circuit and a control circuit. The power factor correction circuit includes a boost unit, an inverter unit, and a feedback unit. The boost unit includes a switch element and a current detection element series-coupled to the switch element. The feedback unit operatively detects an output voltage and an output current of the power factor correction circuit. The control circuit calculates an output power according to the output voltage and the output current, and calculates an input voltage and an input current according to the output power. The control circuit outputs a pulse width modulation signal and controls a conduction current generated by the switch element according to the input current. The control circuit adjusts the duty cycle of the pulse width modulation signal according to the conduction current detected by the current detection element.

12 Claims, 11 Drawing Sheets

|  | UPS 2KVA with 100% nonLinear LOAD | |
|---|---|---|
| Input Vac | THDi | PF |
| 190 | 5.534 | 0.9981 |
| 195 | 4.425 | 0.9986 |
| 200 | 4.144 | 0.9988 |
| 205 | 4.279 | 0.9989 |
| 210 | 4.392 | 0.9988 |
| 215 | 4.411 | 0.9987 |
| 220 | 4.452 | 0.9989 |
| 225 | 4.404 | 0.9988 |
| 230 | 4.652 | 0.9986 |
| 235 | 3.93 | 0.9991 |
| 240 | 4.289 | 0.9991 |
| 245 | 4.319 | 0.9991 |
| 250 | 7.555 | 0.9972 |

|  | UPS 2KVA with 100% Linear LOAD | |
|---|---|---|
| Input Vac | THDi | PF |
| 190 | 5.727 | 0.9981 |
| 195 | 4.435 | 0.9991 |
| 200 | 3.312 | 0.9995 |
| 205 | 2.641 | 0.9997 |
| 210 | 2.385 | 0.9997 |
| 215 | 2.227 | 0.9997 |
| 220 | 2.699 | 0.9996 |
| 225 | 2.689 | 0.9995 |
| 230 | 3.343 | 0.9993 |
| 235 | 3.625 | 0.9985 |
| 240 | 4.001 | 0.9989 |
| 245 | 4.438 | 0.9988 |
| 250 | 4.684 | 0.9987 |

TOTAL HARMONIC CURRENT DISTORTION CONTROL CIRCUIT AND METHOD THEREOF

BACKGROUND

1. Technical Field

The present disclosure relates to a circuit and a method for controlling a total harmonic current distortion (THDi), in particular, to a THDi control circuit and method thereof.

2. Description of Related Art

A power factor (PF) represents the relationship between the effective or the real power and the apparent power. In other words, the power factor is defined as the ratio of the effective power to the apparent power. Basically, a power factor can be used to measure how efficient the electricity is being used. The larger the power factor is, the more efficiently the electricity is used.

A total harmonic current distortion (THDi) represents a distortion level of the current returning to the power grid. The higher the THDi is indicating the higher the distortion level, hence more damage to the power grid and the back-end equipment. High performance equipment generally has the range of the THDi clearly defined. Therefore, the THDi has become an important indicator for high performance equipment.

Power equipment or electronic devices such as power system for computers, LED power source circuit, uninterruptible power supply systems (UPS) and the like, generally are equipped with power factor correction circuits. Currently, there are many limitations to the performance of power factor correction circuits for small-capacity UPS applications (e.g., 1K~6K UPS applications). For instance, when the power factor correction circuit provides a full-load output, the power factor correction circuit can only achieve low THDi (approximately 10%) within a small range of the AC power (e.g., 220V to 230V) supplied.

Furthermore, some UPSs adopt digital control and utilize advanced digital signal processors with powerful computational functionality to implement high performance power factor correction circuits. Although these digital types of UPSs are able to provide the same power factor correction results, but the relative costs and complexities of implementing the power factor correction circuits dramatically increases.

SUMMARY

An exemplary embodiment of the present disclosure discloses a circuit and a method for controlling a total harmonic current distortion (THDi), such that the power factor correction circuit can provide a full-load output with a relative small THDi (approximately 5%) within a wider range of the AC power (i.e., 190 Vac to 250Vac) supplied to the power factor correction circuit.

The present disclosure provides a THDi control circuit and the THDi control circuit includes a power factor correction circuit and a control circuit. The power factor correction circuit includes a boost unit, an inverter unit, and a feedback unit. The boost unit further includes a switch element and a current detection element, wherein the switch element is coupled to the current detection element in series. The inverter unit is coupled to the boost unit. The feedback unit is coupled to the inverter unit. The feedback unit is configured for operatively detecting an output voltage and an output current of the power factor correction circuit. The control circuit is coupled to the boost unit and the feedback unit.

The control circuit operatively calculates an output power according to the output voltage and the output current detected and calculates an input voltage and an input current supplied to the power factor correction circuit according to the output power thereafter. The control circuit generates and outputs a pulse width modulation signal to the switch element of the boost unit according to the output power and the input current to control a conduction current of the switch element. The current detection element operatively generates and outputs a sensing current to the control circuit responsive to the conduction current flow therethorugh. The control circuit adjusts a duty cycle of the pulse width modulation signal according to the sensing current received.

The present disclosure provides a THDi control method the method comprises the following steps. An output power is first calculated according to an output voltage and an input current of a power factor correction circuit. The control circuit calculates an input voltage and an input current supplied to the power factor correction circuit according to the output power and generates a pulse width modulation signal according to the output power and the input current. The control circuit outputs the pulse width modulation signal to the switch element of the boost unit to control a conduction current of the switch element. Then, a current detection element of the boost unit generates a sensing current responsive to the conduction current and the current detection element outputs the sensing current to the control circuit. The control circuit operatively adjusts a duty cycle of the pulse width modulation signal according to the sensing current.

The present disclosure provides the THDi control circuit, which uses the current detection element to generate the sensing current responsive to the conduction current generated by the switch element. Then, the current detection element outputs the sensing current to an adjustment unit of the control circuit. The adjustment unit outputs the first control signal to a second control unit according to the sensing current for adjusting the duty cycle of the pulse width modulation signal. The adjustment unit outputs the pulse width modulation signal with the duty cycle adjusted to a first control unit. The duty cycle of the pulse width modulation signal correspond to the magnitude of the conduction current. Accordingly, the THDi of the power factor correction circuit can be reduced to approximately 5%.

Additionally, the second control unit is operable to output a control voltage to the adjustment unit according to a second adjustment signal of the adjustment unit to control the voltage variation of a line to neutral voltage along with variation in an AC power supplied from the AC power source 8 to the power factor correction circuit to be within a preset range. Such that the power factor correction circuit can provide a full-load output within a wider range of the AC power (approximately 190Vac to 250Vac) supplied to the power factor correction circuit, while attain a smaller THDi (approximately 5%). Therefore, the applicability and the convenience of the THDi control circuit can be enhanced.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

First Exemplary Embodiment

Figure 1:
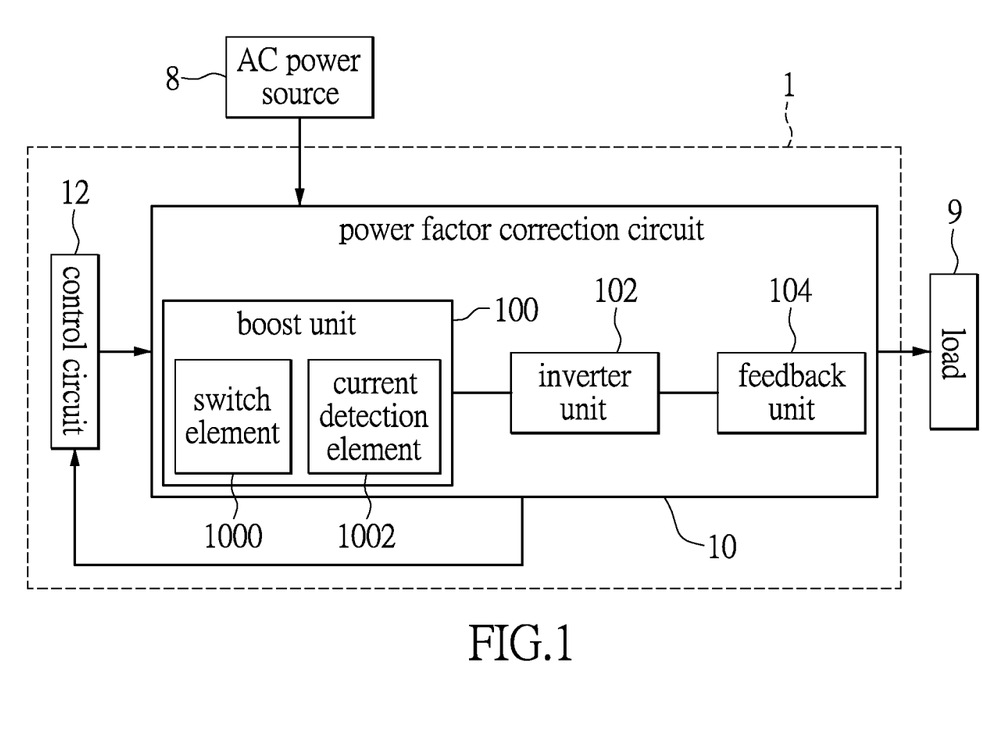
FIG. 1 is a block diagram of a total harmonic current distortion (THDi) control circuit provided in accordance with a first exemplary embodiment of the present disclosure.

Please refer to FIG. 1, which shows a block diagram illustrating a total harmonic current distortion (THDi) control circuit provided in accordance with a first exemplary embodiment of the present disclosure. In the present disclosure, a THDi control circuit 1 can be used in an Uninterruptible Power Supply system (UPS) application for controlling the total harmonic current distortion. The THDi control circuit 1 includes a power factor correction circuit 10 and a control circuit 12. The control circuit 12 is coupled to the power factor correction circuit 10. The power factor correction circuit 10 is coupled to an AC power source 8, a load 9, and the control circuit 12. The control circuit 12 operatively controls a power factor and the THDi of the power factor correction circuit 10 according to an output power of the power factor correction circuit 10 and an input current supplied to the power factor correction circuit 10, so that the power factor of the power factor correction circuit 10 approaches 1. In comparison to the prior art, the THDi control circuit 1 of the present disclosure has the capability of working with a wider range of AC power inputs. For example, the AC power supplied by the AC power source 8 can range from 190Vac to 250Vac, while the THDi can be reduced to approximately 5%.

Specifically, the power factor correction circuit 10 includes a boost unit 100, an inverter unit 102, and a feedback unit 104. The inverter unit 102 is coupled to the boost unit 100 and the feedback unit 104. In practice, the power factor correction circuit 10 can be implemented by a high performance power factor correction circuit, or a conversion circuit operable to cause the power factor to approach unity. The power factor correction circuit 10 can operatively increase a power factor of the UPS to increase the overall power conversion efficiency. However, the present disclosure does not limit the exact type and the exact implementation adopted for the power factor correction circuit 10.

The boost unit 100 includes a switch element 1000 and a current detection element 1002, wherein the switch element 1000 and the current detection element 1002 are connected in series. The boost unit 1000 is implemented by a boost circuit and the switch element 1000 can be a metal-oxide-semiconductor field-effect transistor (MOSFET) or a power transistor. However, the present disclosure is not limited thereto.

The current detection element 1002, such as a current transformer (CT) or a Hall sensor is configured to operatively detect a current flow therethrough. Particularly, the current detection element 1002 is configured to operatively detect a conduction current generated by the switch element 1000 upon conduction. The Hall sensor can be used to avoid magnetic fields interference. However, the exact type and the implementation adopted for the current detection element 1002 may depend upon the practical operational requirement, and the present disclosure is not limited thereto.

The inverter unit 102 is coupled to the boost unit 100 and the feedback unit 104. The inverter unit 102, such as a half-bridge inverter or an inverter, is configured for operatively converting a direct current (DC) into a standard and stable alternating current (AC). The inverter unit 102 operatively outputs an output voltage Vo to the load 9 through a switch transistor (not shown in FIG. 1). Hence, the output voltage Vo is essentially the same as the voltage supplied to the load 9. It shall be noted that the present disclosure does not limit the practical architecture and/or implementation method associated with the inverter unit 102.

The feedback unit 104 is coupled to the inverter unit 102. The feedback unit 104 is configured for detecting an output current I and the output voltage Vo outputted by the inverter unit 102 of the power factor correction circuit 10. The feedback unit 104 can comprise of several electrical elements, including a filter inductance, a filter capacitance, and a current transformer. In the present disclosure, the feedback unit 104 operatively feeds back the output current I and the output voltage Vo to the control circuit 12 to correspondingly control the operation of the power factor correction circuit 10. However, the present disclosure does not limit the exact type and the implementation of the feedback unit 104.

The control circuit 12 is coupled to the boost unit 100 and the feedback unit 104. The control circuit 12 is configured to operatively control the operation of the switch element 1000 of the boost unit 100 according to the output voltage Vo and the output current I. It shall be noted that the conduction operation of the switch element 1000 has direct impacts on the magnitude of the conduction current generated. The control circuit 12 can be a control circuit or controller comprising of a control chip UC3843, a micro-controller chip, and an adjustment unit (not shown). However, the present disclosure is not limited thereto as the practical architecture associated with the control circuit 12 may vary according to the operational or application requirements.

The operation of the THDi control circuit 1 can be briefly described as follow. The control circuit 12 first calculates an output power according to the output voltage Vo and the output current I received. Thereafter, the control circuit 12 calculates an input voltage Vi and an input current according to the output power calculated. Then, the control circuit 12 operatively generates a pulse width modulation (PWM) signal according to the output power and the input current calculated. The control circuit 12 outputs the PWM signal to the switch element 1000 of the boost unit 100 to control the conduction current generated by the switch element 1000. The current detection element 1002 generates a sensing current IS responsive to the conduction current flowing therethrough. The current detection element 1002 outputs the sensing current IS to the control circuit 12 and the control circuit 12 adjusts a duty cycle of the PWM signal according to the sensing current IS received.

Specifically, the control circuit 12 can control the switch element 1000 to generate a larger conduction current to have a capacitor of the boost unit 100 storing electrical energy with larger conduction current. The current detection element 1002 operatively generates a larger sensing current IS in responsive to the conduction current generated by the switch element 1002. The control circuit 12 adjusts and outputs the PWM signal with a larger duty cycle (i.e. longer conduction time) upon receiving the sensing current IS. When the voltage stored in the capacitor of the boost unit 100 reaches a preset voltage, the control circuit 12 controls the switch element 1000 to generate a smaller conduction current so that the capacitor of the boost unit 100 charges with smaller conduction current. The current detection element 1002 operatively generates a smaller sensing current IS responsive to the conduction current flowing therethrough. The current detection element 1002 outputs the sensing current IS to the control circuit 12 to cause the control circuit 12 to generate the PWM signal with a smaller duty cycle (i.e. shorter conduction time).

In addition, the control circuit 12 can further drive the switch element 1000 to cut-off which causes the capacitor of the boost unit 100 to release the electrical energy stored therein to the inverter unit 102. Upon the capacitor of the boost unit 100 completely discharged, the control circuit 12 controls the switch element 1000 to generate a larger conduction current for the capacitor of the boost unit 100 to charge with larger conduction current. At the same time, the current detection element 1002 operatively outputs a larger sensing current IS to the control circuit 12 responsive to the conduction current flowing therethrough, and causes the control circuit 12 to correspondingly generate the PWM signal with a larger duty cycle.

It is worth to note that by inserting the current detection unit 1002 to detect the conduction current of the switch element 1000, the control circuit 12 can thus dynamically adjust the mark-space ratio or the duty cycle of each PWM signal outputted according to the operation of the THDi control circuit 1, which makes the THDi control circuit 1 of the present disclosure a high performance power factor correction circuit.

Information regarding the details circuitry structure and operation of the THDi control circuit 1 are provided in the following paragraph. Please refer to FIG. 2, which shows a block diagram of the THDi control circuit 1 provided in accordance with the first exemplary embodiment of the present disclosure. The power factor correction circuit 10 of the instant embodiment further includes a filtering unit 106 and a rectifying unit 108, wherein the filtering unit 106 is coupled to the AC power source 8, and the rectifying unit 108 is coupled to the filtering unit 106 and the boost unit 100.

Figure 2:
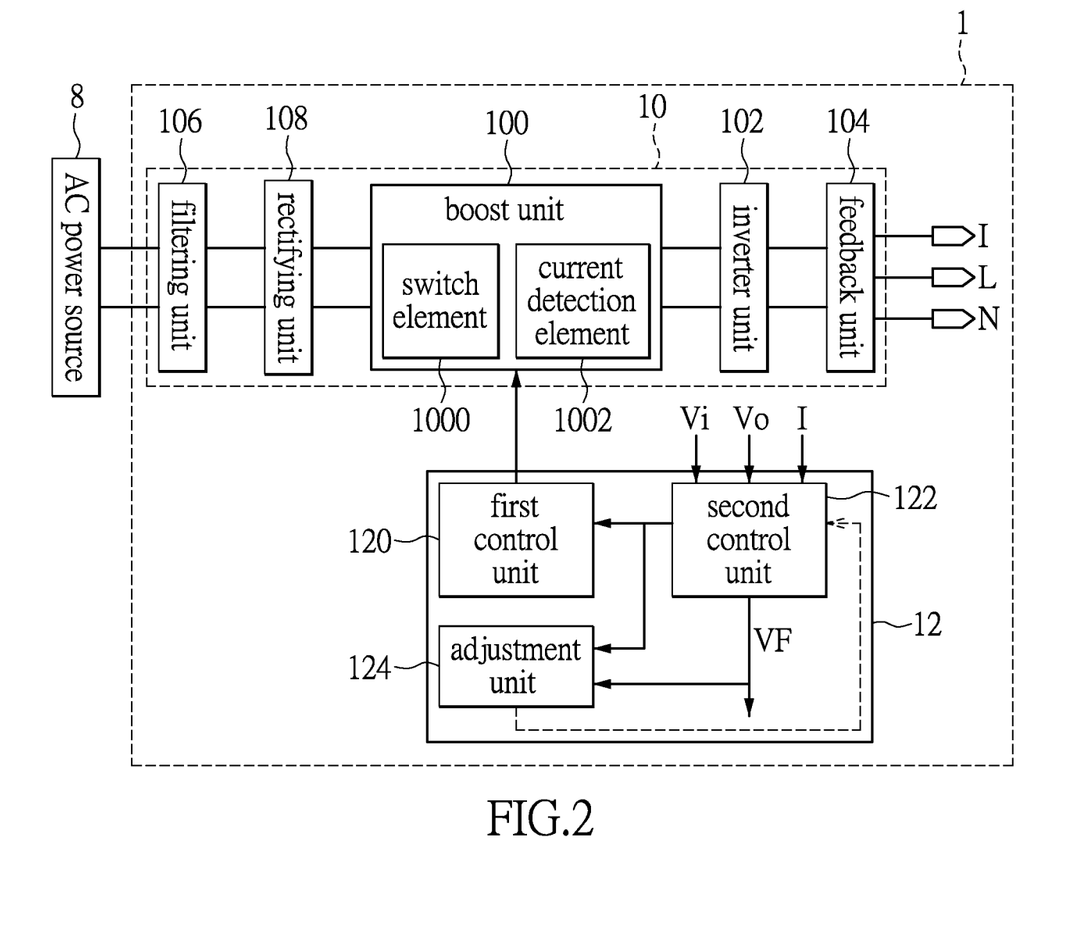
FIG. 2 is a block diagram of another THDi control circuit provided in accordance with the first exemplary embodiment of the present disclosure.

The filtering unit 106 is used for eliminating magnetic field interferences or noises and can be implemented by a magnetic fields interference filter. The rectifying unit 108 is configured to operatively convert an AC power supplied by the AC power source 8 into a DC power through rectification for powering the load 9, wherein the input voltage Vi and the input current are pulsating DC signals. The filtering unit 106 can be implemented by a full-bridge rectifier, a half-bridge rectifier, a AC/DC rectifier, or a full-wave rectifier, however the present disclosure is not limited thereto.

The control circuit 12 includes a first control unit 120, a second control unit 122 and an adjustment unit 124. The first control unit 120 is coupled to the second control unit 122 and the boost unit 100. The second control unit 122 is coupled to a feedback unit 104 and the adjustment unit 124. The adjustment unit 124 is coupled to the current detection element 1002. In practice, the first control unit 120 can be implemented by the control chip UC3843, which is a fixed frequency current-mode PWM controller; the second control unit 122 can be implemented by a programmable micro-controller chip.

The adjustment unit 124 operatively generates a first adjustment signal according to the sensing current IS and the PWM signal received. The adjustment unit 124 outputs a first adjustment signal to the second control unit 122. The second control unit 122 operatively adjusts the duty cycle of the PWM signal according to the first adjustment signal and outputs the PWM signal to the first control unit 120. The first control unit 120 controls the operation of the switch element 100 of the boost unit 100 with the PWM signal. Particularly, the first control unit 120 controls the magnitude of the conduction current generated by the switch element 1000 via adjusting the duty cycle of the PWM signal.

In another embodiment, the adjustment unit 124 can also generate and output the first adjustment signal to the second control unit 122 according solely to the sensing current IS. The second control unit 122 can adjust the duty cycle of the PWM signal according to the first adjustment signal received, and output the PWM signal to the first control unit 120 for adjusting the conduction current of the switch element 100 of the boost unit 100 according to the duty cycle of the PWM signal.

It is worth to note that the control circuit 12 can be configured to further outputs a control voltage VF to control a line to neutral voltage inputted to the power factor correction circuit 10 in a manner that the voltage variation of the line to neutral voltage along with variation in the AC power supplied to the power factor correction circuit 10 from the AC power source 8 is within a preset range. The line to neutral voltage herein is the voltage difference between a DC bus and a neutral bus.

The adjustment unit 124 generates and outputs a second adjustment signal to the second control unit 122 according to the control voltage VF to cause the second control unit 122 to adjust the control voltage VF so that the voltage variation of the line to neutral voltage along with variation in the AC power is within the preset range.

For example, when the AC power of the AC power source 8 is 190Vac, the control circuit 12 controls the voltage variation of the line to neutral voltage varying along with 190Vac AC power to be within the preset range. Similarly, when the AC power of the AC power source 8 is 250Vac, the control circuit 12 can control the voltage variation of the line to neutral voltage varying along with 250Vac AC power to be within the preset range. Therefore, the THDi control circuit 1 of the present disclosure can operate with a wider range AC power input, while attains a high power factor. However, it shall be noted that the present disclosure does not limit the exact range of the AC power supplied to the THDi control circuit 1.

It shall be noted that the THDi control circuit 1 calculates the input voltage Vi and the input current based on the size of the load 9 detected instead of directly detecting the input current supplied to the power factor correction circuit 10. Accordingly, the control circuit 12 of the THDi control circuit 1 is operable to determine the control voltage VF for controlling the line to neutral voltage, and controls the THDi of the power factor correction circuit 10. The THDi control circuit 1 can use feedback control technique to control the overall THDi of the input current based on the input current calculated. The present disclosure adopts a voltage-current dual closed-loop control technique for reducing magnetic field interference and improving the power utilization. Hence, the THDi control circuit 1 of the present disclosure discloses is as previously described a high performance power factor correction circuit.

Based on the above explanations, it can be noted that the present disclosure has solved problems such as the limitation on the range of AC power input for using a UC3843 control chip to implement the high performance power factor correction circuit, and poor THDi associated with the input current supplied to the power factor correction circuit 10. The present disclosure can utilize the low cost UC3843 control chip to implement the high performance power factor correction circuit, and enhance the adaptability of the power factor correction circuit 10 to the input voltage 10. Moreover, the THDi of the input current can be reduced to approximately 5%, effectively reduce the impact of the electrical equipment or device to the power grid.

Second Exemplary Embodiment

Figure 3A:
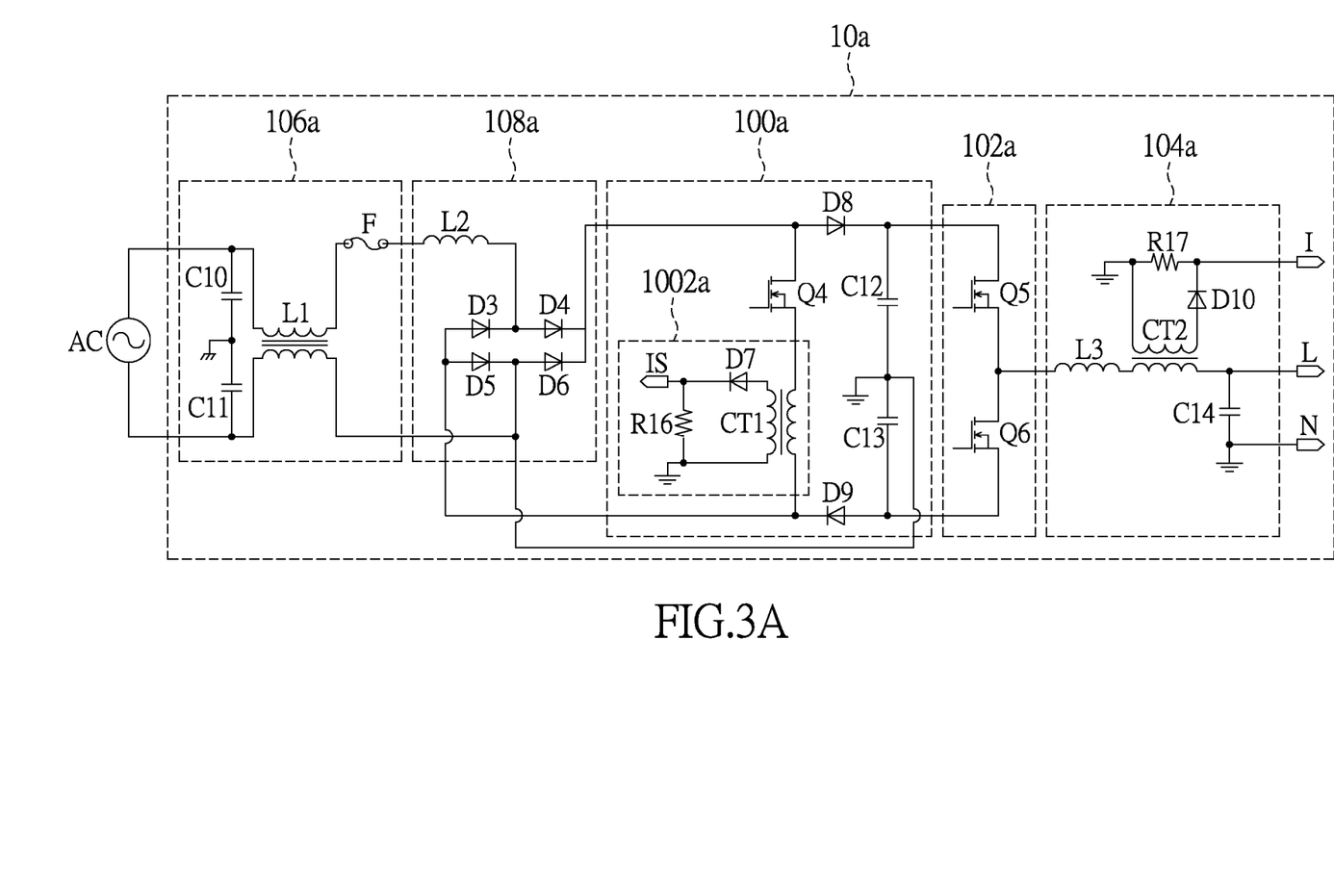
FIG. 3A is a circuit diagram of a THDi control circuit provided in accordance with a second exemplary embodiment of the present disclosure.

Please refer to FIG. 3A, which shows a schematic diagram illustrating a power factor correction circuit of a THDi control circuit provided in accordance with a second exemplary embodiment of the present disclosure. A power factor correction circuit 10a is electrically connected to an AC power source to receive an AC power input. The power factor correction circuit 10a includes a filtering unit 106a, a rectifying unit 108a, a boost unit 100a, an inverter unit 102a, and a feedback unit 104a. An AC power source is coupled to the filtering unit 106a. The rectifying unit 108a is coupled to the filtering unit 106a and the boost unit 100a. The inverter unit 102a is coupled to the boost unit 100a and the feedback unit 104a.

The filtering unit 106a comprises of two filter capacitors C10, C11 and a common-mode inductor L1. The filter capacitor C10 and the filter capacitor C11 are designed to have same capacitance. The two filter capacitors C10, C11 are coupled between the AC power source and the common-mode inductor L1. The filter capacitor C10 has a first end coupled to a positive terminal of the AC power source and a second end thereof coupled to a first end of the filter capacitor C11. A second end of the filter capacitor C11 is coupled to the negative terminal of the AC power source. The first end of the filter capacitor C10 and the second end of the filter capacitor C11 are coupled to the common-mode inductor L1. The rectifying unit 108a includes an energy-storage inductor L2 and a bridge rectifier formed by diodes D3~D6. The energy-storage inductor L2 is coupled to the common-mode inductor L1 and the bridge rectifier.

The boost unit 100a includes a switch element (i.e., a transistor Q4), a current detection element 1002a, a first diode D8, a second diode D9 and a pair of energy-storage capacitors C12, C13. The switch element and the current detection element 1002a are electrically connected in series. The switch element is electrically connected to the bridge rectifier. Specifically, a drain of the transistor Q4 is coupled to the bridge rectifier and a source of the transistor Q4 is coupled to the current detection element 1002a. The first diode D8 is coupled between the drain of the transistor Q4 and one of the energy-storage capacitors C12 and C13. The second diode D9 is coupled to the current detection element 1002a and the energy-storage capacitor C13. The energy-storage capacitor C12 and the energy-storage capacitor C13 are designed to have same capacitance and are interchangeable. The first diode D8 and the second diode D9 are configured to limit the direction of the current. The current detection element 1002a can be implemented by a high-frequency current transformer CT1, a diode D17, and a resistor R16. However, the exact type and the implementation method adopted for the boost unit 100a depend upon the practical operational requirements and the present disclosure is not limited to the example provided herein.

The inverter unit 102a is a half-bridge inverter circuit including two switching transistors Q5, Q6. The inverter unit 102a is configured to output an AC output power to the load 9 (not shown in FIG. 3a). The two switching transistors Q5, Q6 can be implemented by MOSFETs of same model number, respectively. In addition, the feedback unit 104a includes a filter inductor L3, a filter capacitor C14, and a current transformer CT2. The filter inductor L3 is coupled to the inverter unit 102a and the current transformer CT2. The filter capacitor C14 is coupled to the current transformer CT2. The filter capacitor C14 is coupled to an output line bus L and an output neutral bus N. The current transformer CT2 is coupled to an output current bus I. The feedback unit 104a detects and receives an output voltage Vo through the filter capacitance C14. The feedback unit 104a generates an output current I using the current transformer CT2.

It can be seen that the THDi control circuit 1 of the present disclosure calculates an output power of the power factor correction circuit 10a according to the output voltage Vo and the output current I detected, and calculates an input voltage Vi and an input current supplied to the power factor correction circuit 10a according to the output power. The control circuit 12 of the THDi control circuit 1 operatively generates a PWM signal according to the output power and the input current for controlling the operation of the power factor correction circuit 10a. In particular, the PWM signal is configured to control the operation of the switch element (i.e., the transistor Q4) for controlling the conduction current thereof so as to control the THDi to be approximately 5%.

Figure 3B:
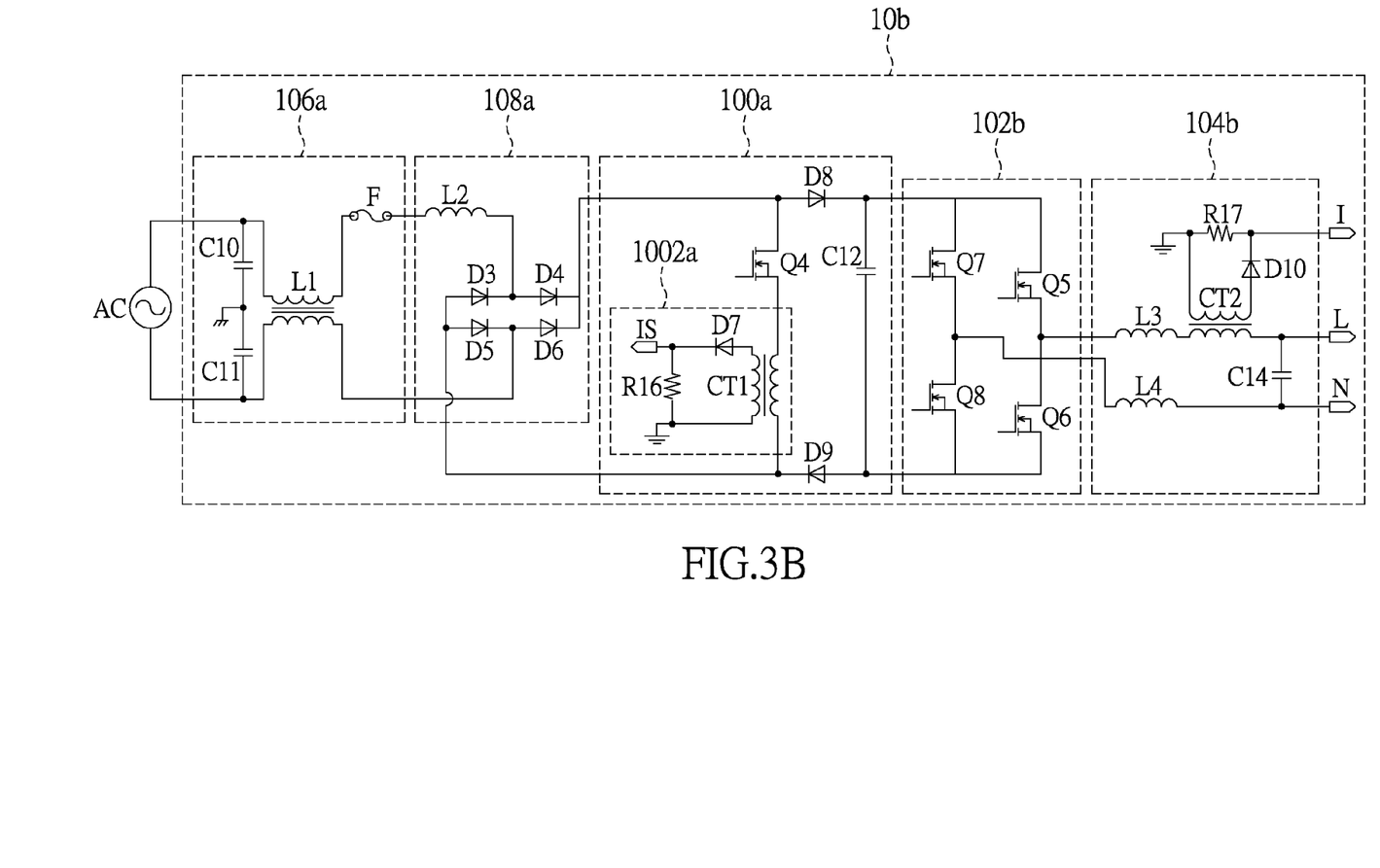
FIG. 3B is a circuit diagram of another THDi control circuit provided in accordance with the second exemplary embodiment of the present disclosure.

Please refer to FIGS. 3A and 3B. FIG. 3B shows a diagram illustrating a power factor correction circuit 10b of the THDi control circuit 1 provided in accordance with a second exemplary embodiment of the present disclosure. The power factor correction circuit 10b of FIG. 3B is similar to the power factor correction circuit 10a described previously. The differences between a power factor correction circuit 10b and a power factor correction circuit 10a is in the implementation of the inverter unit. The inverter unit 102a of the power factor correction circuit 10a is implemented by a half-bridge inverter while an invert unit 102b of the power factor correction circuit 10b is implemented by a full-bridge inverter. Moreover, a junction node formed between a switch transistor Q7 and a switch transistor Q8 is configured to connect to a filter inductor L4 of a feedback unit 104b. The operation of the filter inductor L4 is similar to the operation of the filter inductor L3 of the FIG. 3A, hence those skilled in the art shall be able to infer the operation of the filter inductor L4. In addition to above described discrepancies, those skilled in the art should be able to infer the operation of the power factor correction circuit 10b based on the above elaborations, and further descriptions are hereby omitted. FIG. 3A and FIG. 3B merely used to illustrate a possible implementation for the power factor correction circuit of the THDi control circuit 1 and the present disclosure is not limited thereto.

Figure 4:
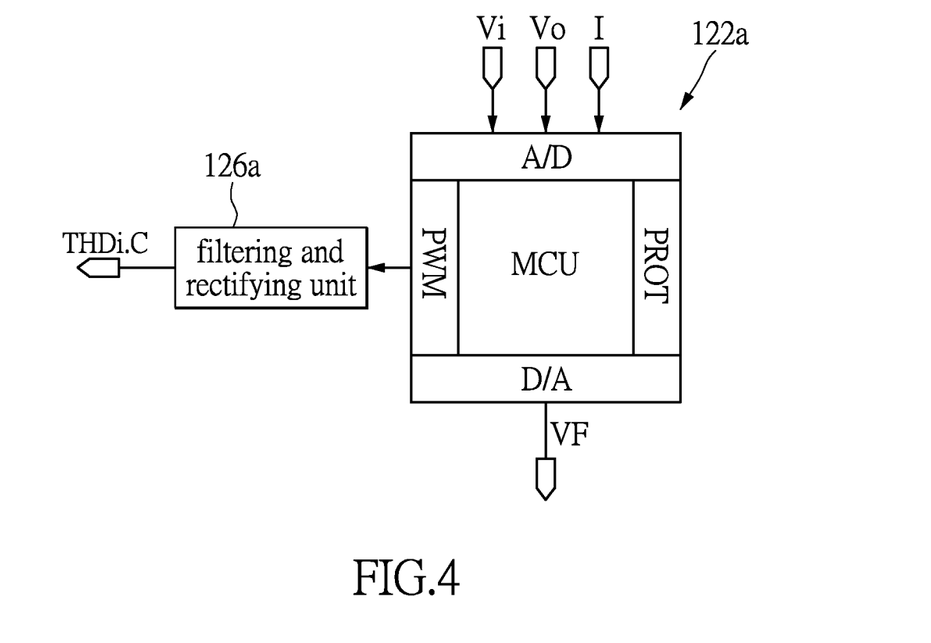
FIG. 4 is a diagram of a second control unit of the THDi control circuit of FIG. 3 provided in accordance with the second exemplary embodiment of the present disclosure.

Please refer to FIG. 4 and FIG. 3A. FIG. 4 shows a diagram illustrating a second control unit of the THDi control circuit 1 for provided in accordance with the second exemplary embodiment of the present disclosure. The second control unit 122a can be implemented by a microcontroller chip having an A/D converter, a D/A converter, a PWM converter, and a PROT converter. The second control unit 122a is configured to operatively convert the analog signals of the output current I, the output voltage Vo and the input voltage Vi into digital signal with the A/D converter. The second control unit 122a further is configured to convert the output voltage Vo and the input voltage Vi being converted and processed in the digital domain back to analog signals with the D/A converter. The second control unit 122a generates a control voltage VF according to the output voltage Vo and the input voltage Vi. The second control unit 122a generates the PWM signal for controlling the aforementioned switch element according to the output current I. In particular, the second control unit 122a can use a pulse-width modulation technique and generate the PWM signal according to the digitized output current I with the PWM converter.

The microcontroller chip described in the instant embodiment is configured to output the PWM signal with the PWM converter, and the PWM signal is used to control the conduction current of the switch element (i.e., the transistor Q4). The microcontroller chip further is configured to receive a first adjustment signal and/or a second adjustment signal with the PROT converter. The control circuit of the THDi control circuit having power factor correction capability, rather than using complex circuitries of multipliers and dividers, operates simply with the output voltage Vo and the output current I feedback thereto. Thereby reduce the overall circuit complexity as well as the associated manufacturing costs.

Third Exemplary Embodiment

Figure 5:
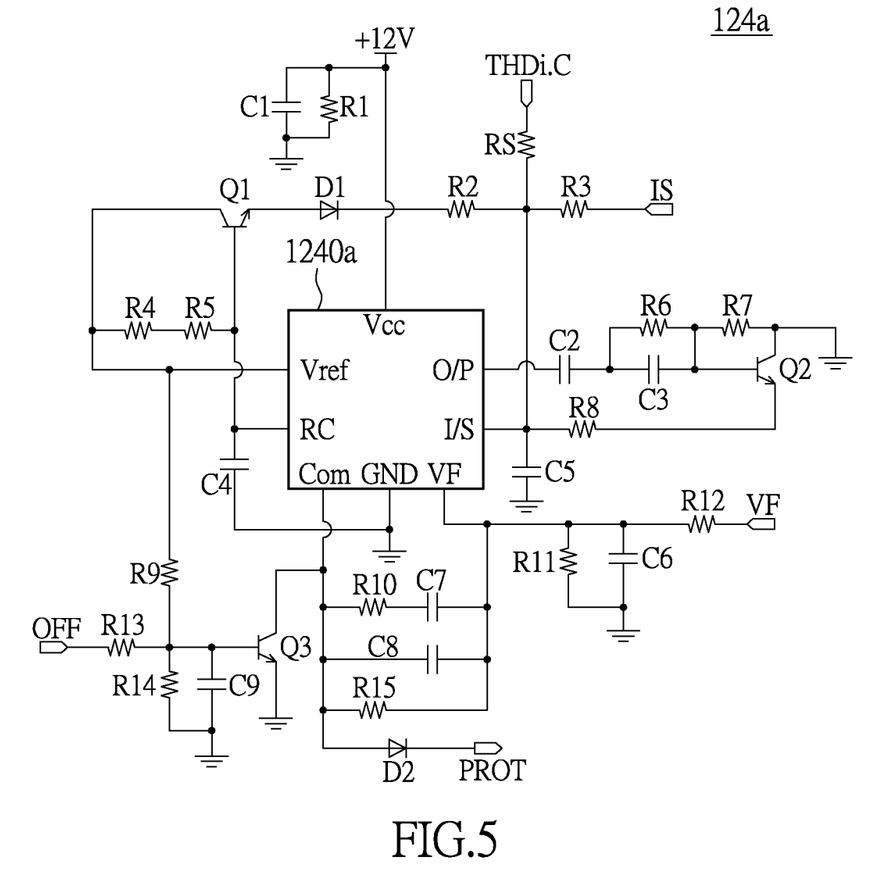
FIG. 5 is a circuit diagram of an adjustment unit of the THDi control circuit of FIG. 3 provided in accordance with a third exemplary embodiment of the present disclosure.

Please refer to FIG. 5 and FIG. 3A. FIG. 5 shows a schematic diagram illustrating an adjustment unit of a THDi control circuit provided in accordance with a third exemplary embodiment of the present disclosure. The adjustment unit 124a can be implemented by a processing chip 1240 and various electrical components including a plurality of capacitors C1 to C9, a plurality of resistors R1 to R15, RS and a plurality of bipolar junction transistors (BJT) Q1~Q3. The processing chip 1240a has a plurality of pins. An I/S pin is configured to receive the aforementioned sensing current IS and the PWM signal. A VF pin is configured to receive a control voltage VF. The circuitry for detecting the control voltage VF and the circuitry for detecting the sensing current IS are two independent and separated closed loops such that the control voltage VF and the sensing current IS can be individually detected, thereby increases the current and voltage detection accuracy. A Com pin is configured to output a first adjustment signal and/or a second adjustment signal to the aforementioned second control unit. For example, the second control unit 122a of FIG. 4 can be configured to receive the first adjustment signal and/or the second adjustment signal with a PROT converter. It shall be noted that FIG. 5 merely serve to illustrate an implementation for the adjustment unit 124a and the present disclosure is not limited thereto.

Forth Exemplary Embodiment

Figure 6:
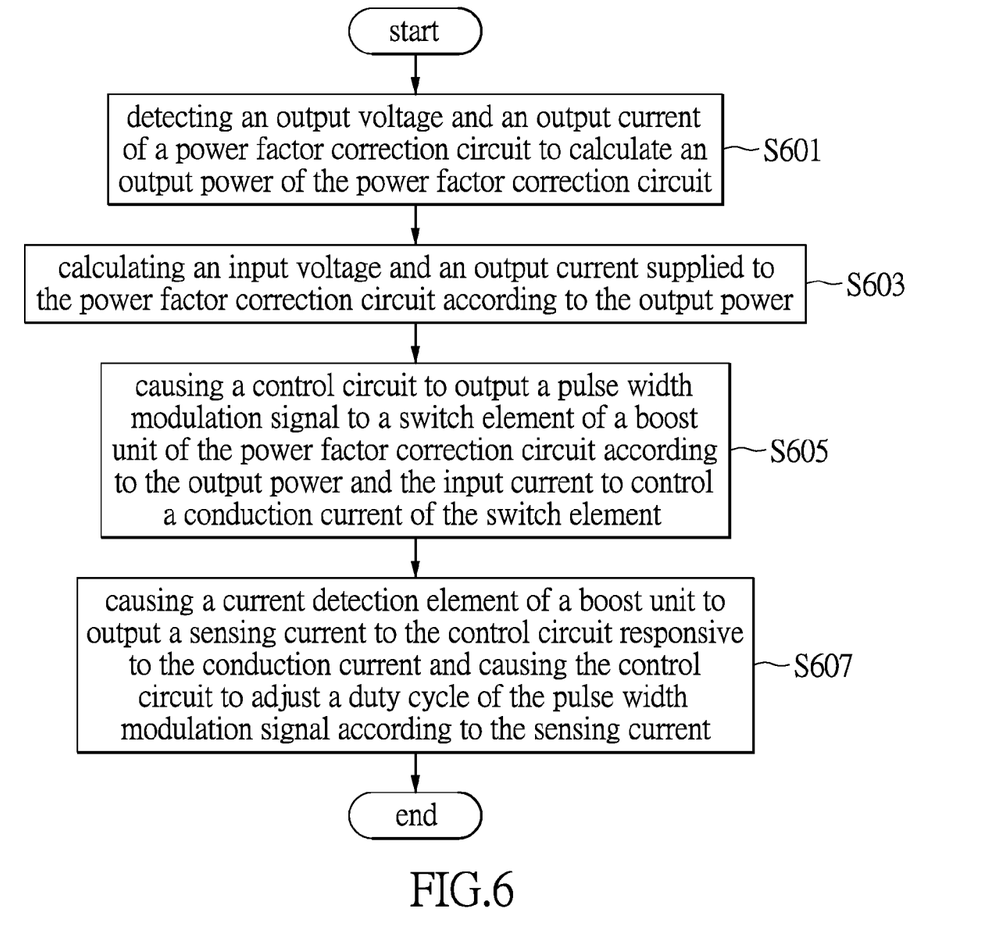
FIG. 6 is a flowchart illustrating a method for controlling the THDi provided in accordance with a forth exemplary embodiment of the present disclosure.

Please refer to FIG. 6 in conjunction with FIG. 2. FIG. 6 shows a flowchart illustrating a method for controlling a total harmonic current distortion (THDi) provided in accordance with a forth exemplary embodiment of the present disclosure. The method for controlling THDi is adopted for the aforementioned THDi control circuit 1 comprising of a power factor correction circuit 10 and the control circuit 12.

In Step S601, a control circuit 12 drives a feedback unit 104 to detect an output voltage Vo and an output current I outputted by the power factor correction circuit 10. The control circuit 12 calculates an output power according to the output voltage Vo and the output current I.

In Step S603, the control circuit 12 calculates an input voltage Vi and an input current according to the output power calculated. In practice, since the feedback unit 104 is coupled to an inverter unit 102 to receive outputs therefrom, hence the output power of the inverter unit 102 is similar to the output power used to drive a load 9. Therefore, the control circuit 12 can calculate the input voltage Vi according to the output power, and calculates the input current according to the input voltage Vi calculated.

In Step S605, the control circuit 12 generates a PWM signal according to the output power and the input current. The control circuit 12 outputs the PWM signal to a switch element 1000 of a boost unit 100 of a power factor correction circuit 10 to control the conduction current of the switch element 1000. The duty cycle of the PWM signal can control a conduction time of the switch element 1000, and the conduction time of the switch element 1000 affects the conduction current of the THDi control circuit 1.

In Step S607, a current detection element 1002 of the boost unit 100 generates a sensing current IS in responsive to the conduction current of the switch element. The current detection element 1002 outputs the sensing current IS to the control circuit 12, and the control circuit 12 adjusts the duty cycle of the PWM signal according to the sensing current IS. In particular, an adjustment unit 124 of the control circuit 12 generates a first adjustment signal according to the sensing current IS and the PWM signal. The adjustment unit 124 outputs the first adjustment signal to a second adjustment unit 122 of the control circuit 12 for the second adjustment unit 122 to adjust the duty cycle of the PWM signal according to the first adjustment signal. The second adjustment unit 122 outputs the PWM signal to a first adjustment unit 120 of the control circuit 12 and the first adjustment unit 120 adjusts the conduction current of the switch element 1000 according to the duty cycle of the PWM signal.

In another embodiment, the method for controlling the THDi further includes causing the control circuit 12 to output a control voltage VF to control a line to neutral voltage inputted to the power factor correction circuit 10 in a manner that the voltage variation of the line to neutral voltage along with variation in the AC power of the AC power source 8 is within a preset range. Specifically, the adjustment unit 124 of the control circuit 12 can generate a second adjustment signal according to the control voltage VF outputted by the second control unit 122. The adjustment unit 124 outputs the second adjustment signal to the second control unit 122 to cause the second control unit 122 to adjust the control voltage VF according to the second adjustment signal so that the voltage variation of the line to neutral voltage along with the variation in the AC power is controlled to be within the preset voltage.

Fifth Exemplary Embodiment

Figure 7:
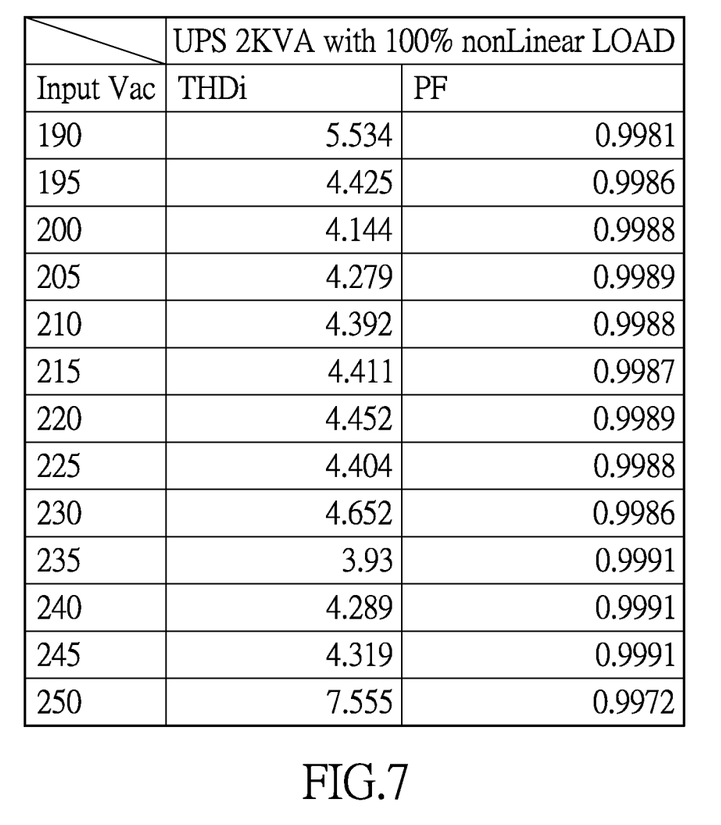
FIG. 7 is a table illustrating an operation of the THDi control circuit for full non-linear output load provided in accordance with a fifth exemplary embodiment of the present disclosure.
Figure 8A:
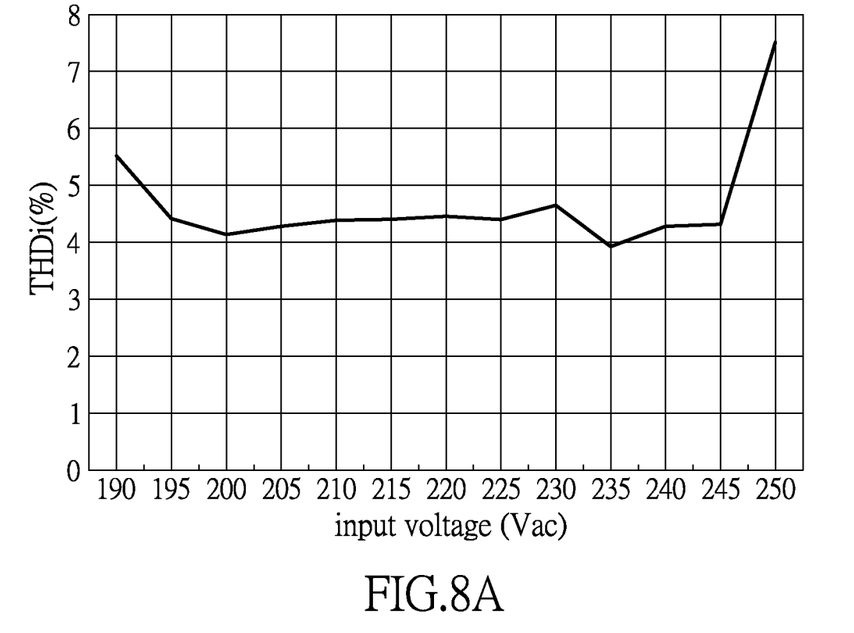
FIG. 8A is a waveform illustrating a relationship between the THDi and an input voltage provided in accordance with the fifth exemplary embodiment of the present disclosure.
Figure 8B:
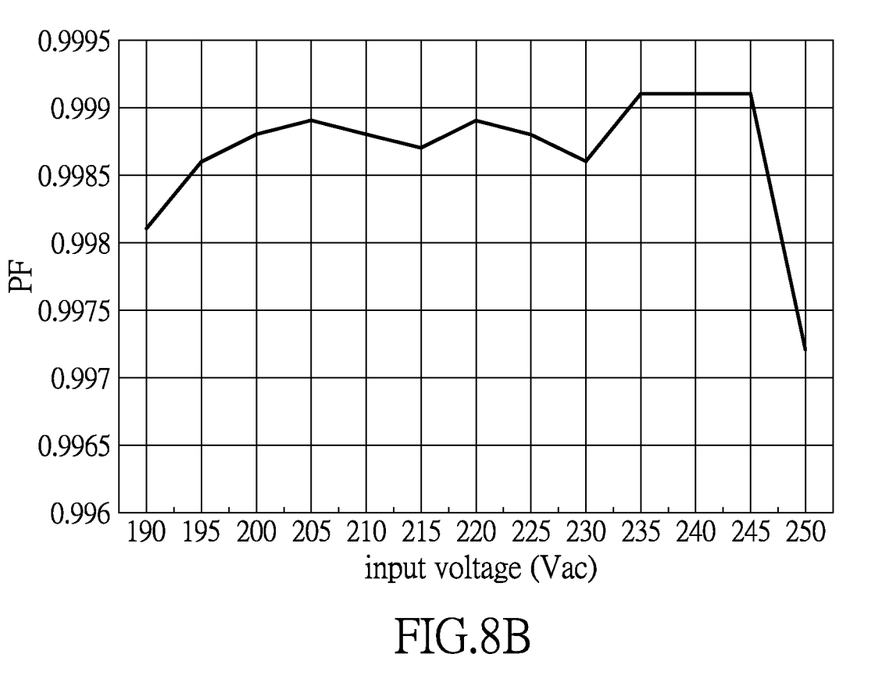
FIG. 8B is a waveform illustrating a relationship between a power factor and the input voltage provided in accordance with the fifth exemplary embodiment of the present disclosure.

Please refer to FIG. 7, FIG. 8A and FIG. 8B at same time. FIG. 7 shows a table illustrating an operation of aforementioned THDi control circuit for full non-linear output load provided in accordance with a fifth exemplary embodiment of the present disclosure. FIG. 8A shows a waveform illustrating a relationship between the THDi and an input voltage provided in accordance with the fifth exemplary embodiment of the present disclosure. FIG. 8B shows an waveform illustrating a relationship between a power factor and the input voltage provided in accordance with the fifth exemplary embodiment of the present disclosure.

FIG. 7, FIG. 8A, and FIG. 8B respectively show results of an UPS of 2KVA using the aforementioned THDi control circuit and the method thereof tested under a full non-linear load. The AC power input supplied ranges from 190 Vac to 250 Vac. When the AC power input is less than 190 Vac, the THDi is measured to be approximately 5.534%. When the AC power input is greater than 250 Vac, the THDi is measured to be approximately 7.555%. In briefly, when the AC power input falls outside the range of 190 Vac to 250 Vac, the THDi is controlled to range from 5% to 10%; when the AC power input is within 190 Vac to 250 Vac, the THDi is controlled to range from 3.93% to 4.652%, while the power factor ranged from 0.9986 to 0.9991. Accordingly, the THDi control circuit and the method for controlling the THDi provided in the present disclosure, in comparison to prior art is capable of dealing with wider range of AC power input while able to achieve relative low THDi and high power factor.

Sixth Exemplary Embodiment

Figure 9:
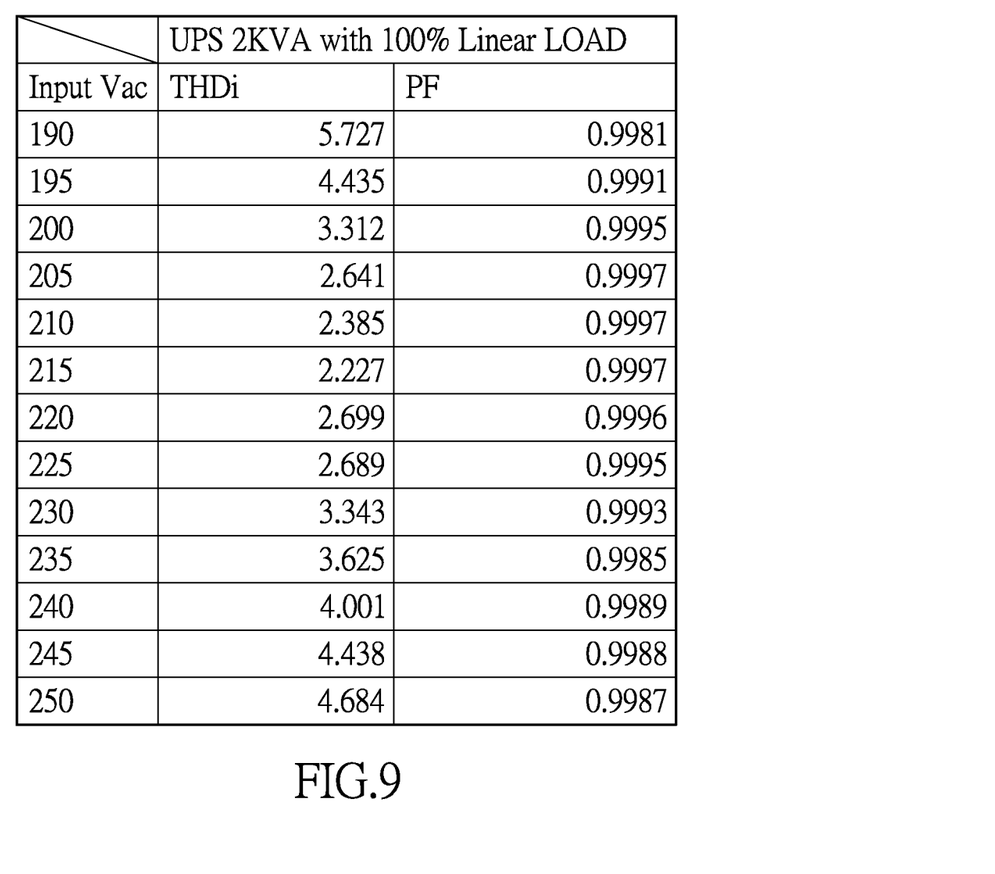
FIG. 9 is a table illustrating an operation of the THDi control circuit for full linear output load provided in accordance with a sixth exemplary embodiment of the present disclosure.
Figure 10A:
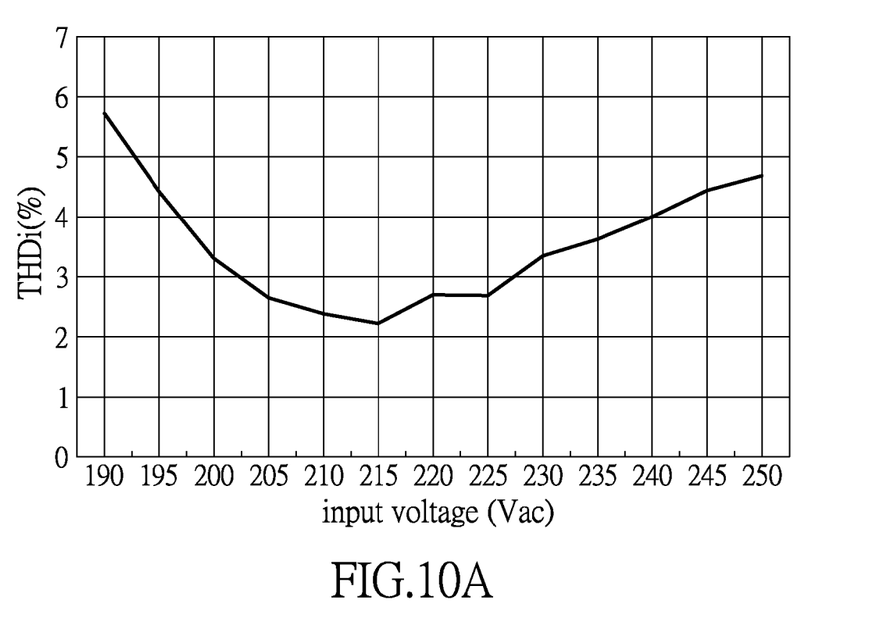
FIG. 10A is a waveform illustrating the relationship between the THDi and the input voltage provided in accordance with the sixth exemplary embodiment of the present disclosure.
Figure 10B:
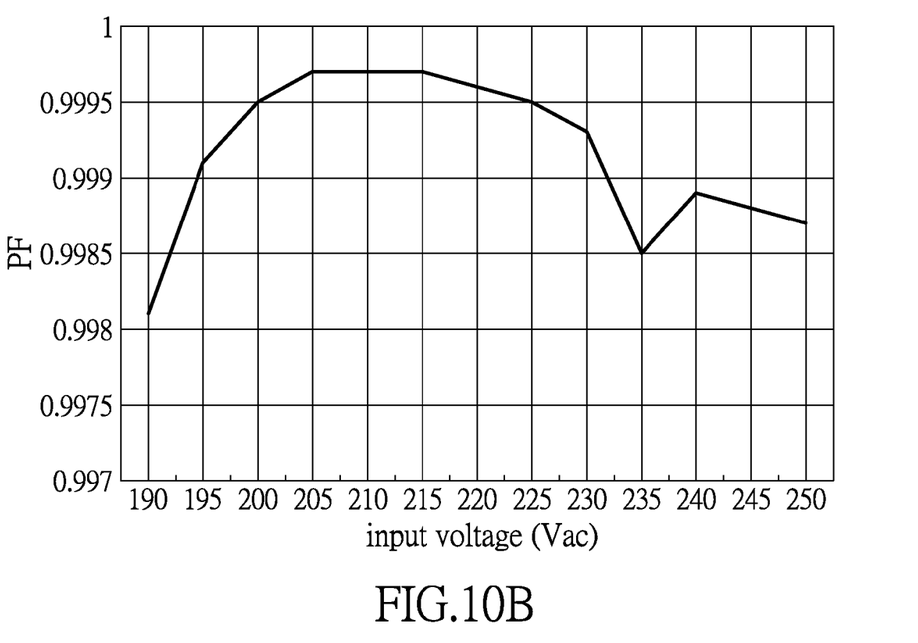
FIG. 10B is a waveform illustrating the relationship between the power factor and the input voltage provided in accordance with the sixth exemplary embodiment of the present disclosure.

Please refer to FIG. 9, FIG. 10A and FIG. 10B at the same time. FIG. 9 shows a table illustrating an operation of the THDi control circuit for full linear output load provided in accordance with a sixth exemplary embodiment of the present disclosure. FIG. 10A is a waveform illustrating a relationship between the THDi and an input voltage provided in accordance with the sixth exemplary embodiment of the present disclosure. FIG. 10B is a waveform illustrating a relationship between a power factor and the input voltage provided in accordance with the sixth exemplary embodiment of the present disclosure.

FIGS. 9, 10A and 10B respectively show results of an UPS of 2KVA using the aforementioned THDi control circuit and the method thereof tested under a full linear load operation. The AC power input supplied in the instant embodiment ranges from 190 Vac to 250 Vac. The THDi for AC power input less than 190 Vac is measured to be approximately 5.727% and the THDi for AC power input within 190 Vac to 250 Vac is measured to range from 2.227% to 4.684% with the power factor ranges from 0.9985 to 0.9997. Accordingly, the THDi control circuit and the method for controlling the THDi provided in the present disclosure, in comparison to prior art is capable of dealing with wider range of AC power input while able to achieve relative low THDi and high power factor.

In summary, the present disclosure provides the THDi control, circuit and the THDi control circuit uses a current detection element to generate the sensing current responsive to the conduction current generated by the switch element. Then, the current detection element outputs the sensing current to an adjustment unit of the control circuit. The adjustment unit outputs the first control signal to a second control unit according to the sensing current for adjusting the duty cycle of the pulse width modulation signal. The adjustment unit outputs the pulse width modulation signal with the duty cycle adjusted to a first control unit. The duty cycle of the pulse width modulation signal correspond to the magnitude of the conduction current. Accordingly, the THDi of the power factor correction circuit can be reduced to approximately 5%.

Additionally, the second control unit is operable to output a control voltage to the adjustment unit according to a second adjustment signal of the adjustment unit to control the voltage variation of a line to neutral voltage along with variation in an AC power supplied from the AC power source to the power factor correction circuit to be within a preset range. Such that the power factor correction circuit can provide a full-load output within a wider range of the AC power (approximately 190Vac to 250Vac) supplied from the AC power source to the power factor correction circuit, while attain a smaller THDi (approximately 5%). Therefore, the applicability and the convenience of the THDi control circuit can be enhanced.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A total harmonic current distortion (THDi) control circuit, comprising:
 a power factor correction circuit, comprising:
 a boost unit, comprising a switch element and a current detection element, wherein the switch element is coupled to the current detection element in series;
 an inverter unit coupled to the boost unit; and
 a feedback unit coupled to the inverter unit, configured for operatively detecting an output voltage and an output current of the power factor correction circuit; and
 a control circuit coupled to the boost unit and the feedback unit;
 wherein the control circuit operatively calculates an output power according to the output voltage and the output current, and thereafter the control circuit calculates an input voltage and an input current supplied to the power factor correction circuit according to the output power calculated for generating a pulse width modulation signal to control a conduction current of the switch element of the boost unit; wherein the current detection element operatively outputs a sensing current to the control circuit responsive to the conduction current and the control circuit adjusts a duty cycle of the pulse width modulation signal according to the sensing current received; wherein the sensing current is proportional to the duty cycle of the pulse width modulation signal.

2. The THDi control circuit according to claim 1, wherein the control circuit comprises a first control unit, a second control unit, and an adjustment unit; the first control unit is coupled to the second control unit and the boost unit; the second control unit is coupled to the feedback unit and the adjustment unit; the adjustment unit is coupled to the current detection element.

3. The THDi control circuit according to claim 2, wherein the adjustment unit is configured to operatively output a first adjustment signal to the second control unit according to the sensing current, the second control unit adjusts the duty cycle of the pulse width modulation signal according to the first adjustment signal received, and the first control unit adjusts the conduction current of the switch element of the boost unit according to the duty cycle of the pulse width modulation signal.

4. The THDi according control circuit to claim 2, wherein the adjustment unit operatively generates a first adjustment signal to the second control unit according to the sensing current and the pulse width modulation signal, the second control unit adjusts the duty cycle of the pulse width modulation signal according to the first adjustment signal received, and the first control unit adjusts the conduction current of the switch element of the boost unit according to the duty cycle of the pulse width modulation signal.

5. The THDi control circuit according to claim 2, wherein the control circuit outputs a control voltage to control a line to neutral voltage inputted to the power factor correction circuit in a manner that the voltage variation of the line to neutral voltage along with variation in an AC power supplied to the power factor correction circuit is within a preset range.

6. The THDi control circuit according to claim 5, wherein the adjustment unit outputs a second adjustment signal to the second control unit according to the control voltage received from the second control unit and causes the second control unit to adjust the control voltage for controlling the voltage variation of the line to neutral voltage along with variation in the AC power to be within the preset range.

7. The THDi control circuit according to claim 1, wherein the power factor correction circuit further comprises:
   a filtering unit, configured to receive an AC power, and comprising a pair of filter capacitors and a common-mode inductor, the pair of filter capacitances being coupled to the common-mode inductor and configured to receive the AC power; and
   a rectifying unit coupled to the filtering unit and the boost unit, comprising an energy-storage inductor and a bridge rectifier, the energy-storage inductor being coupled to the common-mode inductor and the bridge rectifier.

8. The THDi control circuit according to claim 1, wherein the inverter unit is a half-bridge inverter circuit comprising two switch transistors, and the inverter unit is configured to operatively output an AC power to a load; a feedback unit comprises a filter inductor, a filter capacitor, and a current transformer, wherein the filter inductor is coupled to the inverter unit and the current transformer; the filter capacitor is coupled to the current transformer, an output line bus and an output neutral bus; the current transformer is coupled to an output current bus.

9. The THDi control circuit according to claim 1, wherein the boost unit further comprises a first diode, a second diode, and a pair of energy-storage capacitors; the first diode is coupled to the switch element and one of the energy-storage capacitor; the second diode is coupled to the current detection element and the other energy-storage capacitor.

10. A total harmonic current distortion (THDi) control method, adapted for a THDi control circuit comprising of a power factor correction circuit and a control circuit, and the THDi control method comprising:
   detecting an output voltage and an output current of the power factor correction circuit to calculate an output power;
   causing the control circuit to calculate an input voltage and an input current supplied to the power factor correction circuit based on the output power calculated;
   causing the control circuit to output a pulse width modulation signal to a switch element of a boost unit of the power factor correction circuit according to the output power and the input current to control a conduction current of the switch element; and
   causing the control circuit to adjust a duty cycle of the pulse width modulation signal according to a sensing current generated by a current detection element of the boost unit in responsive to the conduction current; wherein the sensing current is proportional to the duty cycle of the pulse width modulation signal.

11. The THDi control method according to claim 10, wherein the step of adjusting the duty cycle of the pulse width modulation signal according to the sensing current comprises:
   causing an adjustment unit of the control circuit to generate a first adjustment signal to a second control unit of the control circuit according to the sensing current and the pulse width modulation signal and causing the second control unit to adjust the duty cycle of the pulse width modulation signal according to the first adjustment signal received;
   causing a first control unit of the control circuit to adjust the conduction current generated by the switch element of the boost unit according to the duty cycle of the pulse width modulation signal.

12. The THDi control method according to claim 11, further comprising:
   causing the control circuit to output a control voltage for controlling a line to neutral voltage in a manner that the voltage variation of the line to neutral voltage along with variation in an AC power supplied to the power factor correction circuit is within a preset range;
   wherein the adjustment unit of the control unit outputs a second adjustment signal according to the control voltage outputted by the second control unit of the control circuit, and the second control unit adjusts the control voltage according to the second adjustment signal received such that the voltage variation of a line to neutral voltage along with the variation of an AC power supplied to the THDi control circuit is within a preset range.

* * * * *